(12) United States Patent
Benoit et al.

(10) Patent No.: US 12,229,309 B2
(45) Date of Patent: Feb. 18, 2025

(54) SECURE ELEMENT THAT LEVERAGES EXTERNAL RESOURCES

(71) Applicant: Google LLC, Mountain View, CA (US)

(72) Inventors: Olivier Jean Benoit, San Diego, CA (US); Prasad Modali, Fremont, CA (US); Vinoth Kumar Deivasigamani, San Diego, CA (US)

(73) Assignee: Google LLC, Mountain View, CA (US)

( * ) Notice: Subject to any disclaimer, the term of this patent is extended or adjusted under 35 U.S.C. 154(b) by 294 days.

(21) Appl. No.: 17/757,957

(22) PCT Filed: Feb. 27, 2020

(86) PCT No.: PCT/US2020/020071
§ 371 (c)(1),
(2) Date: Jun. 24, 2022

(87) PCT Pub. No.: WO2021/173137
PCT Pub. Date: Sep. 2, 2021

(65) Prior Publication Data
US 2023/0020841 A1 Jan. 19, 2023

(51) Int. Cl.
G06F 21/62 (2013.01)
G06F 21/60 (2013.01)

(52) U.S. Cl.
CPC ........ *G06F 21/6245* (2013.01); *G06F 21/602* (2013.01)

(58) Field of Classification Search
None
See application file for complete search history.

(56) References Cited

U.S. PATENT DOCUMENTS

| 6,449,720 | B1 | 9/2002 | Sprague et al. |
| 7,406,603 | B1* | 7/2008 | MacKay ............... G06F 21/55 726/16 |
| 9,015,495 | B2 | 4/2015 | Priestley et al. |
| 2003/0004881 | A1* | 1/2003 | Shinzaki ............... H04L 63/083 705/51 |

(Continued)

FOREIGN PATENT DOCUMENTS

WO 2021173137 9/2021

OTHER PUBLICATIONS

"International Search Report and Written Opinion", PCT Application No. PCT/US2020/020071, Nov. 23, 2020, 28 pages.

(Continued)

*Primary Examiner* — Chris Parry
*Assistant Examiner* — Abderrahmen Chouat
(74) *Attorney, Agent, or Firm* — Colby Nipper PLLC

(57) ABSTRACT

This document describes a secure element that leverages the resources of a computer system to perform specialized functions using sensitive information. The secure element securely stores sensitive information on flash memory of the computer system. In response to a request requiring use of sensitive information, the secure element loads a security application and sensitive information from the computer system. By leveraging external resources, the secure element may flexibly accommodate increasing resource requirements of the computer system and be used in a wide range of computer systems.

20 Claims, 9 Drawing Sheets

(56) References Cited

U.S. PATENT DOCUMENTS

| | | | |
|---|---|---|---|
| 2005/0193139 A1* | 9/2005 | Vinson | G06F 21/6218 |
| | | | 717/176 |
| 2007/0266154 A1* | 11/2007 | Ohta | G06F 21/316 |
| | | | 709/225 |
| 2010/0146301 A1* | 6/2010 | Shevchenko | H04L 63/06 |
| | | | 713/193 |
| 2014/0013406 A1* | 1/2014 | Tremlet | G09C 1/00 |
| | | | 726/5 |
| 2016/0028698 A1* | 1/2016 | Antipa | G06F 21/606 |
| | | | 713/150 |
| 2017/0103378 A1 | 4/2017 | Pan | |
| 2018/0307650 A1* | 10/2018 | Kachare | G06F 15/17331 |
| 2018/0365411 A1* | 12/2018 | Falk | H04L 63/123 |
| 2019/0179767 A1* | 6/2019 | Tsirkin | G06F 9/5077 |
| 2020/0242274 A1* | 7/2020 | Pan | G07G 1/14 |
| 2020/0336322 A1* | 10/2020 | Asanghanwa | H04L 41/5051 |
| 2020/0410105 A1* | 12/2020 | Allo | G06F 3/0658 |

OTHER PUBLICATIONS

"Invitation to Pay Additional Fees", PCT Application No. PCT/US2020/020071, Oct. 2, 2020, 20 pages.

"International Preliminary Report on Patentability", Application No. PCT/US2020/020071, Aug. 30, 2022, 17 pages.

\* cited by examiner

SECURE ELEMENT THAT LEVERAGES EXTERNAL RESOURCES

RELATED APPLICATION(S)

This application is a national stage entry of International Application No. PCT/US2020/020071, filed Feb. 27, 2020, the disclosure which is incorporated herein by reference in its entirety.

BACKGROUND

Computer systems, such as smartphones, wearable computers, and tablets, often include one or more secure elements to execute specialized functions using sensitive information. In other words, the secure element provides an environment to securely store sensitive information and execute applications for completing financial transactions, performing cryptographic functions, accessing telecommunication networks and other external resources, authenticating a user, or accessing sensitive user data.

A secure element is typically a standalone component of a computer system with fixed non-volatile memory capacity. As computer systems perform more and more specialized functions using sensitive information, the resources of a secure element become insufficient. It is cost-prohibitive to significantly enlarge the non-volatile memory of secure elements, especially because some computer systems will not utilize the additional memory. A secure element with sufficient resources to accommodate a wide range of computer systems and upgrades in computer-system functionality is needed.

SUMMARY

This document describes a secure element that leverages the resources of a computer system to perform specialized functions using sensitive information. The secure element securely stores sensitive information on non-volatile memory of the computer system. In response to a request requiring use of sensitive information, the secure element loads a security application and sensitive information from the computer system. By leveraging external resources, the secure element may flexibly accommodate increasing resource requirements of the computer system and be used in a wide range of computer systems.

For example, a secure element is described that cryptographically processes sensitive information before securing it in memory of a computer system. In response to a request requiring use of sensitive information, the secure element loads a security application and sensitive information from memory of the computer system into internal memory of the secure element. The secure element cryptographically processes (e.g., decrypts, authenticates, and verifies the freshness of) the sensitive information. The secure element then executes the security application and generates a result using the sensitive information. The secure element outputs the result to the computer system.

This document also describes other configurations of, and methods for, a secure element for leveraging the resources of a computer system to process and secure sensitive information, as well as computer systems that include these secure-element configurations.

This summary is provided to introduce simplified concepts for a secure element to leverage external resources, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of a secure element leveraging external resources are described in this document with reference to the following drawings. The same numbers are used throughout multiple drawings to reference like features and components:

FIG. 4-1 illustrates an example configuration of a secure element to complete a financial transaction.

FIG. 4-2 illustrates an example configuration of a secure element accessing user biometric data to log into an application.

FIGS. 5-1 through 5-4 illustrate example configurations of a secure element to access a mobile network.

DETAILED DESCRIPTION

Overview

Figure 1:
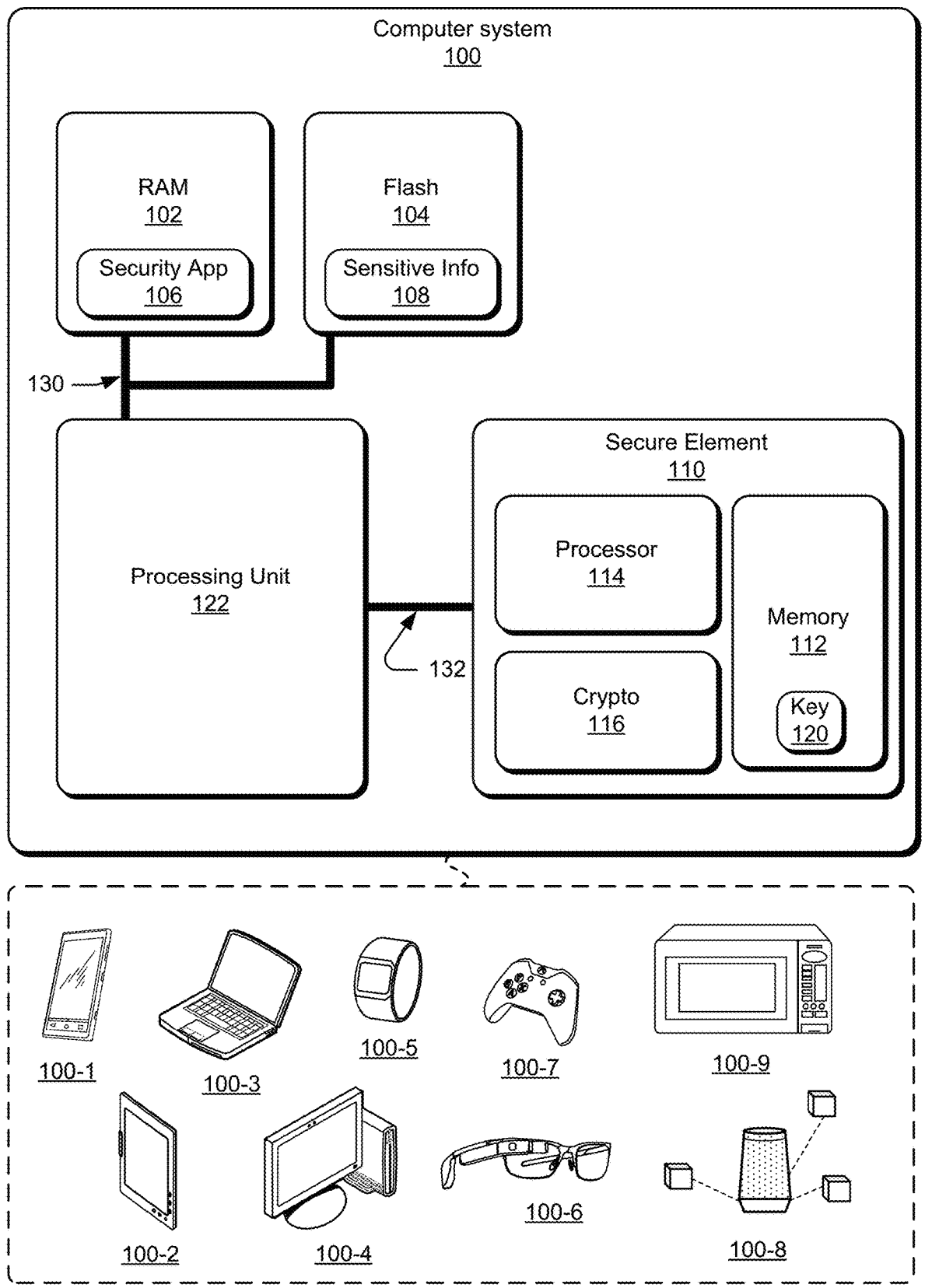
FIG. 1 illustrates an example secure element of a computer system that leverages memory of the computer system to securely store sensitive information.

This document describes a secure element that leverages resources of a computer system to perform specialized functions requiring use of sensitive information. In response to a request requiring use of sensitive information, the secure element loads a security application and sensitive information from memory of the computer system that is external to the secure element. A processor of the secure element then executes the security application to generate, using the sensitive information, a result. By leveraging external resources of the computer system, the secure element may be used in a wide range of computer systems and flexibly accommodate increasing resource requirements, such as when a computer system is upgraded or required to perform additional specialized functions. By so doing, the described secure element reduces costs without compromising the security of sensitive information.

By way of example, consider a secure element installed in a smartphone. When purchased, the secure element is configured to access communication networks using cryptographic keys and to complete financial transactions using financial data. As new applications are added, the secure element must secure and process additional sensitive information. A conventional secure element has a fixed amount of non-volatile memory and cannot leverage the resources (e.g., flash memory) of the smartphone. As a result, the conventional secure element is eventually unable to secure and process additional sensitive information. Alternatively, the secure element has enough non-volatile memory to accommodate future upgrades and added functionality. The extra memory, however, is expensive and may be unnecessary for the market segment, computer system, and use cases of the secure element.

In contrast, the described secure element leverages the large external memory of the smartphone (e.g., flash memory) to store applications and sensitive information.

Typically, the flash memory of the smartphone is multiple orders of magnitude larger than that of a conventional secure element. Cryptographic processing by the secure element securely stores sensitive information in the flash memory of the smartphone, along with other system code and data. Although other smartphone components can access the flash memory, the cryptographic processing secures the sensitive information from the other components. In response to a request requiring use of sensitive information, the secure element loads a security application and sensitive information from the external memory of the smartphone. The secure element then executes the security application to generate, using the sensitive information, a result. The smartphone is configured, based on the output of the result by the secure element, to perform a secure function, access a resource, and so forth. Accordingly, the secure element maintains the security of a conventional secure element, while its secure storage capacity is only limited by the capacity of the external memory of the computer system.

Furthermore, the described secure element may be configured with reduced memory or perform better by successively loading portions of the security application. The secure element may then generate intermediate results needed for a specialized function, thereby reducing the internal volatile memory (e.g., random-access memory (RAM)) requirements of a secure element.

As a working example, consider a smartphone that is powered on and attempts to connect to a mobile network. The smartphone sends a message to the mobile network to initiate a connection procedure. In response, the mobile network sends an authentication request, which includes a random value, to the smartphone. The secure element loads network authentication software and related sensitive information, including a mobile-network operator (MNO) profile with an authentication key, from the smartphone memory into its internal RAM. The MNO initially provided the authentication key to the smartphone within the MNO profile during a provisioning step upon subscription to the mobile-network service by the user. The secure element stores the MNO profile, which contains the authentication key, as encrypted data in the flash memory of the smartphone. The secure element then cryptographically processes the MNO profile, along with the authentication key, and executes the network authentication software. The secure element calculates, using algorithms in the network authentication software, a response value based on the random value and the authentication key.

Before the smartphone transmits a response, the secure element loads network cipher software from the smartphone memory into its internal RAM. The secure element can load the network cipher software over the previously-loaded network authentication software. Based on the random value and the authentication key, the secure element calculates a session key using algorithms contained in the network cipher software. The smartphone then sends the response value and session key to the mobile network. If the response value matches the value calculated by the mobile network, the mobile network authenticates the smartphone and grants it access. Subsequent voice messages over the mobile network are encrypted and decrypted using the session key.

These are just two examples of how the described secure element may be configured to leverage external resources of a computer system. Other example configurations and methods of use are described throughout this document. This document now describes example configurations of the described secure element, after which example methods are described.

Configurations of the Described Secure Element

FIG. 1 illustrates an example secure element 110 that leverages resources of a computer system 100 to secure sensitive information 108. The sensitive information 108 may include access keys, cryptographic keys, financial data, user health data, user biometric data, and the like. The computer system 100 can be a variety of consumer electronic devices. As non-limiting examples, the computer system 100 can be a mobile phone 100-1, a tablet device 100-2, an automotive display, a laptop computer 100-3, a television, an electronic display, a desktop computer 100-4, a computerized watch 100-5, a wearable computer 100-6, a video game controller 100-7, a server, a networked multimedia or voice-assistant system 100-8, or an appliance 100-9.

The computer system 100 includes the secure element 110, a processing unit 122, a random-access memory (RAM) 102, and a flash memory 104. The RAM 102 and the flash memory 104 are external to the secure element 110 and not incorporated within the secure element 110. The secure element 110 leverages the flash memory 104 to store a security application 106 and the sensitive information 108. The term "security application" as used herein refers to an application that can be executed by a processor 114 within the secure element 110. In the context of the security application 106, the word "security" is intended for the sake of identification and should not be taken to imply any requirements or limitations on the functionality of the security application 106.

The RAM 102 may load the security application 106 to perform functions that do not require use of the sensitive information 108. Within the secure element 110, the security application 106 may use the sensitive information 108 to perform a specialized function. For example, the secure element 110 may facilitate financial transactions by storing and using a user's personal information (e.g., account numbers, routing numbers, credentials, security tokens). The secure element 110 may also perform a health-monitoring function to document a health record of the user in the flash memory 104. As another example, the computer system 100 can include software for an embedded subscriber identity module (eSIM), and the secure element 110 can use the flash memory 104 to store telecommunication data associated with the user. Also, the secure element 110 may perform authentication functions (e.g., password authentication, facial authentication, fingerprint authentication) and require the flash memory 104 to store the authentication data for subsequent use and retrieval.

The processing unit 122 functions as a central processor for the computer system 100. The processing unit 122 may include other components, such as processors, communication units (e.g., modems), input/output controllers, sensor hubs, system interfaces, and the like.

The flash memory 104 stores the sensitive information 108 and the security application 106, along with other executable instructions (e.g., firmware, recovery firmware, software, applications, modules, programs, functions, and the like) and data (e.g., user data, operational data, scan results). The flash memory 104 provides a large amount of storage capacity. Although described primarily as flash memory, the flash memory 104 can be any non-volatile memory component for persistent storage. The flash memory 104 is accessible by the processing unit 122 and other components of the computer system 100. Unless data is cryptographically secured before being written to the flash memory 104, any system component may read or modify the data.

While the computer system 100 executes the security application 106, the security application 106 or a portion of the security application 106 is loaded into the RAM 102. The RAM 102 can be any volatile memory used by the computer system 100 to store active code and data. The RAM 102 can include various implementations of RAM, including dynamic random-access memory (DRAM), synchronous dynamic random-access memory (SDRAM), double data rate (DDR) SDRAM, and other types of volatile memory in various configurations.

The RAM 102 and the flash memory 104 are typically not certified as components having security functionality. Computer components may be assessed against industry standards to gain certification of particular security properties. For example, Common Criteria for Information Technology Security Evaluation (also known as Common Criteria) is an international standard for the development, evaluation, and certification of security features for hardware and software components. The RAM 102 and the flash memory 104 can thus be implemented using generic and widely-available memory components, rather than specialized certified components.

The RAM 102, the flash memory 104, and the processing unit 122 communicate over a link 130. The link 130 may be a memory bus linking the processing unit 122 and other components of the computer system 100 to the RAM 102 and the flash memory 104. The RAM 102, the flash memory 104, and the processing unit 122 are physically separate components from the secure element 110. In other words, the secure element 110 may access the RAM 102, the flash memory 104, and the processing unit 122, but these components are external to the secure element 110.

The secure element 110 and the processing unit 122 communicate over a link 132. The link 132 is generally not secure. The link 132 may be a memory bus linking the processing unit 122 and other components of the computer system 100 to the secure element 110.

The secure element 110 communicates with the RAM 102 and the flash memory 104 via the link 132 and the link 130. The secure element 110 accesses the security application 106 from the RAM 102 or the flash memory 104. The secure element 110 also accesses the sensitive information 108 from the RAM 102 or the flash memory 104. The secure element 110 directs read or write commands over the link 132 and the link 130 to the RAM 102 and the flash memory 104.

The secure element 110 includes memory 112, the processor 114, and a cryptographic processing engine 116. In some cases, the memory 112 may comprise more than one component, such as a non-volatile memory and an internal RAM. The non-volatile memory of memory 112 can include any flash-type memory or non-flash-type memory configured to store data securely. The non-volatile memory may include flash memory and read-only memory (ROM). Like RAM 102, the internal RAM of the memory 112 can include various implementations of RAM, including DRAM, SDRAM, DDR SDRAM, and other types of volatile or non-volatile memory in different configurations. In other cases, the memory 112 may comprise a single component, such as a non-volatile RAM (NVRAM). The NVRAM of the memory 112 may include magnetic RAM (MRAM) or resistive RAM (RRAM). MRAM and RRAM do not lose stored data if power to the secure element 110 is lost. In addition, MRAM and RRAM allow the secure element 110 to respond to a request in low-power mode or while being powered by an electromagnetic radiation field. The memory 112 is typically much smaller than the flash memory 104. As an example, the flash memory 104 of a smartphone may have a 64-gigabyte (GB) capacity; in contrast, the memory 112 of the secure element 110 is multiple orders of magnitude smaller (e.g., 1 megabyte (MB)). The memory 112, however, provides sufficient storage to store a cryptographic key 120 and other cryptographic information (e.g., additional cryptographic keys, timestamp information, replay counters) to secure and process the sensitive information 108. Unlike data stored in the flash memory 104, data maintained in the memory 112 is only accessible within the secure element 110.

The memory 112 or internal RAM of the memory 112 stores working data and code. When the secure element 110 responds to a request requiring use of the sensitive information 108, the security application 106 or a portion of the security application 106 is loaded, from the RAM 102 or the flash memory 104 via the link 130 and the link 132, into the memory 112.

Because the memory 112 stores the cryptographic key 120 and does not store the sensitive information 108 or the security application 106, the memory 112 is much smaller than the flash memory 104. With future upgrades and expansions of the computer system 100, the amount of sensitive information 108 secured and processed by the described secure element 110 can grow without requiring increases in memory 112.

The processor 114 executes computer-executable instructions, including the security application 106, to perform specialized functions using the sensitive information 108. The processor 114 may include any combination of one or more controllers, microcontrollers, processors, microprocessors, and the like.

The cryptographic processing engine 116 manages, alone or in combination with the processor 114, cryptographic processing of the sensitive information 108. The cryptographic processing engine 116 may be implemented as hardware, programmable logic, software, controllers, or microcontrollers. The cryptographic processing engine 116, alone or in combination with the processor 114, encrypts the sensitive information 108 using the cryptographic key 120 before writing it to the flash memory 104. After the secure element 110 loads the sensitive information 108 from the flash memory 104, the cryptographic processing engine 116, alone or in combination with the processor 114, decrypts the sensitive information 108 using the cryptographic key 120. The cryptographic processing engine 116, alone or in combination with processor 114, also authenticates and verifies the freshness of the sensitive information 108. Without the cryptographic key 120, the sensitive information 108 is secure and unusable by other components and systems.

The cryptographic processing engine 116 may provide forward security by changing the cryptographic key 120 automatically. In case the cryptographic key 120 is ever compromised, the cryptographic key 120 is automatically updated before each encryption and subsequent write of the sensitive information 108 to the flash memory 104. Alternatively, the cryptographic processing engine 116 may generate a new cryptographic key randomly, periodically, or in response to an event.

Figure 2:
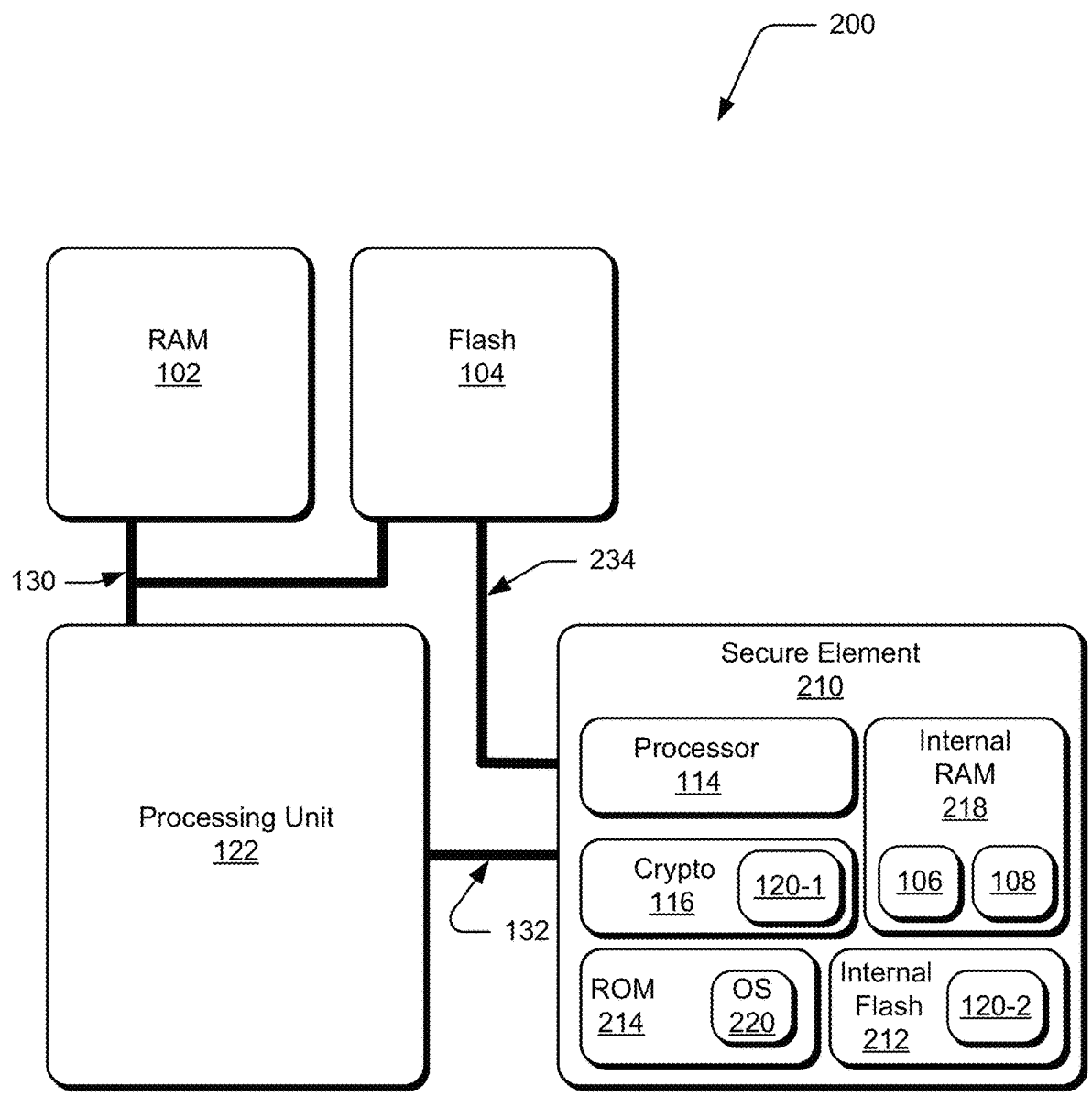
FIG. 2 illustrates an example of a secure element that leverages memory of a computer system to respond to a request requiring use of sensitive information.

FIG. 2 illustrates an example configuration of the secure element 210 that leverages the RAM 102 and the flash memory 104 to respond to a request requiring use of the sensitive information 108. In this example, the computer system 200 and the secure element 210 include similar components to those shown in the computer system 100 and the secure element 110 in FIG. 1, with some additional detail.

The memory of the secure element 210 includes an internal RAM 218, an internal flash memory 212, and a read-only memory (ROM) 214. The internal flash memory 212 stores the cryptographic key 120. The internal flash memory 212 may also temporarily store the sensitive information 108, when the sensitive information 108 is loaded by the secure element 210 in response to a specialized-function request.

The ROM 214 stores an operating system (OS) 220 that manages operation of the secure element 210. The processor 114 utilizes the operating system 220 to execute the security application 106 or the portion of the security application 106 when the security application 106 or the portion of the security application 106 is loaded into the internal RAM 218.

The secure element 210 may receive a request to perform a secure function such as facilitating a financial transaction or performing a cryptographic function; access a resource internal or external to the computer system such as authenticating access to a communication network, logging into an application on the computer system 200, or entering an authenticated state of the computer system 200; or process sensitive data such as performing a health-monitoring function. The request requires the secure element 210 to execute the security application 106 using the sensitive information 108.

In response to the request, the secure element 210 loads the security application 106 or a portion of the security application 106 into the internal RAM 218. The security application 106 or the portion of the security application 106 is loaded, over the link 130 and the link 132, from the RAM 102 or the flash memory 104.

The secure element 210 also loads, from the flash memory 104 over the link 130 and the link 132 into the internal RAM 218 or the internal flash memory 212, the sensitive information 108. The link 130 and the link 132 may be a low-latency link without an internal buffer that allows the secure element 210 to perform direct read and write operations to the RAM 102 and the flash memory 104. As an example, the link 130 and the link 132 may comprise a peripheral component interconnect express (PCI Express or PCIe) link. Alternatively, the secure element 210 loads the security application 106, the portion of the security application 106, or the sensitive information 108 over the link 234. The link 234 provides the secure element 210 direct byte-for-byte correlation or memory-mapped access to data (e.g., the sensitive information 108, the security application 106, the portion of the security application 106) stored in the flash memory 104. The link 234 enables the secure element 210 to treat the mapped portion of the flash memory 104 as if it were included in the secure element 210, allowing for faster read and write operations than over the link 130 and the link 132.

The cryptographic processing engine 116, alone or in combination with the processor 114, decrypts the sensitive information 108 using a cryptographic key 120-1. The cryptographic processing engine 116, alone or in combination with the processor 114 and using cryptographic key 120-1, authenticates and verifies the freshness of the sensitive information 108. The cryptographic key 120-1 is retrieved from the internal flash memory 212. The cryptographic processing engine 116, alone or in combination with the processor 114, may also cryptographically process, using the cryptographic key 120-1 or another cryptographic key (not shown), the security application 106 or the portion of the security application 106.

The processor 114 executes the security application 106 or the portion of the security application 106 to generate a result using the sensitive information 108. The secure element 210 outputs, using the processor 114, the result to the processing unit 122. The computer system 200 is configured, based on the output of the result by the secure element, to perform a secure function, authenticate access to a resource that is internal or external to the computer system 200, or process sensitive data. For example, the computer system 200 is configured, based on the output of the result, to facilitate a financial transaction, perform a cryptographic function, authenticate access for the computer system 200 or a user of the computer system 200 to a communication network, log in to an application on the computer system 200, enter an authenticated state of the computer system 200, perform a health-monitoring function, and the like.

The cryptographic processing engine 116, alone or in combination with the processor 114, may then cryptographically process (e.g., encrypt, sign, timestamp) the sensitive information 108 using the cryptographic key 120-1 or an updated cryptographic key 120-2. The secure element 210 then writes, to the flash memory 104, the sensitive information 108 over the older sensitive information 108. The secure element 210 also removes the sensitive information 108 from the internal RAM 218 or the internal flash memory 212.

Alternatively, after executing the security application 106 or the portion of the security application 106, the secure element 210 determines if the sensitive information 108 was modified. If the sensitive information 108 was modified, the cryptographic processing engine 116, alone or in combination with the processor 114, cryptographically processes the sensitive information 108 using the cryptographic key 120-1 or the updated cryptographic key 120-2. The secure element 210 then writes, to the flash memory 104, the sensitive information 108 over the older sensitive information 108. If the sensitive information 108 was not modified, the secure element 210 removes the sensitive information 108 from the internal RAM 218 or the internal flash memory 212.

Figure 3:
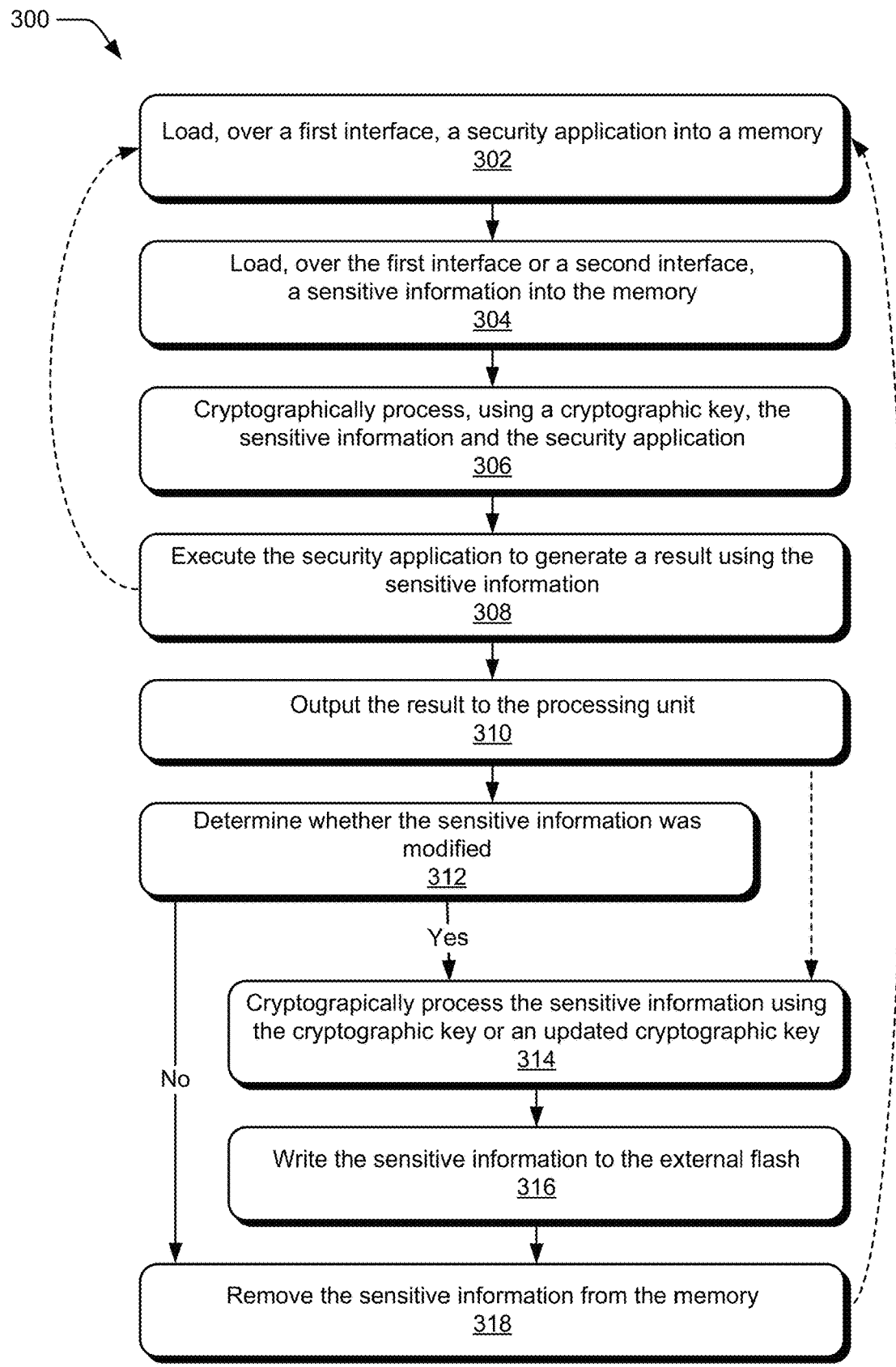
FIG. 3 is a flow-chart illustrating example operations performed by a secure element to leverage external resources of a computer system in response to a request requiring use of sensitive information.

FIG. 3 is a flowchart illustrating example operations 300 performed by the secure element 110 in response to a request requiring use of the sensitive information 108. The operations 300 are described in the context of the computer system 100 of FIG. 1. The operations 300 may be performed in a different order or with additional or fewer operations than illustrated.

At 302, the secure element 110 loads, from the RAM 102 or the flash memory 104 and over a first interface comprised of the link 130 and the link 132, the security application 106 or a portion of the security application 106 into the memory 112.

At 304, the secure element 110 loads, from the flash memory 104 and over the first interface or a second interface comprised of a memory-mapped link, the sensitive information 108 into the memory 112.

At 306, the cryptographic processing engine 116, alone or in combination with the processor 114, cryptographically processes the sensitive information 108 using the cryptographic key 120-1. In some instances, the cryptographic processing engine 116, alone or in combination with the processor 114, may also cryptographically process the security application 106 or the portion of the security application 106 using the cryptographic key 120-1.

At 308, the processor 114 executes the security application 106 or the portion of the security application 106 to generate, using the sensitive information 108, a result. In some instances, the secure element 110 repeats operations 302 and 308 to successively load portions of the security application 106 and execute the portions of the security application 106 to generate, using the sensitive information 108 or an earlier intermediate result, intermediate results.

At 310, the secure element 110, by the processor 114, outputs the result to the processing unit 122. In some instances, the result includes one or more of the intermediate results from operation 308. The computer system 100 is configured, based on the output of the result by the secure element 110, to perform a secure function, authenticate access to resources internal or external to the computer system 100, or process sensitive data. For example, the computer system 100 can be configured to facilitate a financial transaction, encrypt communications, perform a health-monitoring function, access a communication network, and the like.

In some instances, the secure element 110 performs further operations on the sensitive information 108. At 312, the secure element 110 determines if the sensitive information 108 was modified. At 314, if the sensitive information 108 was modified, the cryptographic processing engine 116, alone or in combination with the processor 114, cryptographically processes, using the cryptographic key 120-1 or an updated cryptographic key, the sensitive information 108. At 316, the modified sensitive information 108 is written to the flash memory 104 over the sensitive information 108. At 318, the sensitive information 108 is removed from the memory 112. If the sensitive information 108 was not modified, the secure element 110 skips operations 314 and 316 and performs operation 318. In other instances, the secure element 110 may skip operation 312 and perform operations 314 through 318.

If a second request requiring use of sensitive information is received, the secure element 110 repeats operations 302 through 318, as necessary.

Example Configurations

This section illustrates example configurations of a secure element, which may operate separately or together in whole or in part. This section describes various example configurations, each set forth in a subsection for ease of reading; these subsection titles do not limit the interoperability of each of these configurations.

Financial Transaction

Figures 1, 4:
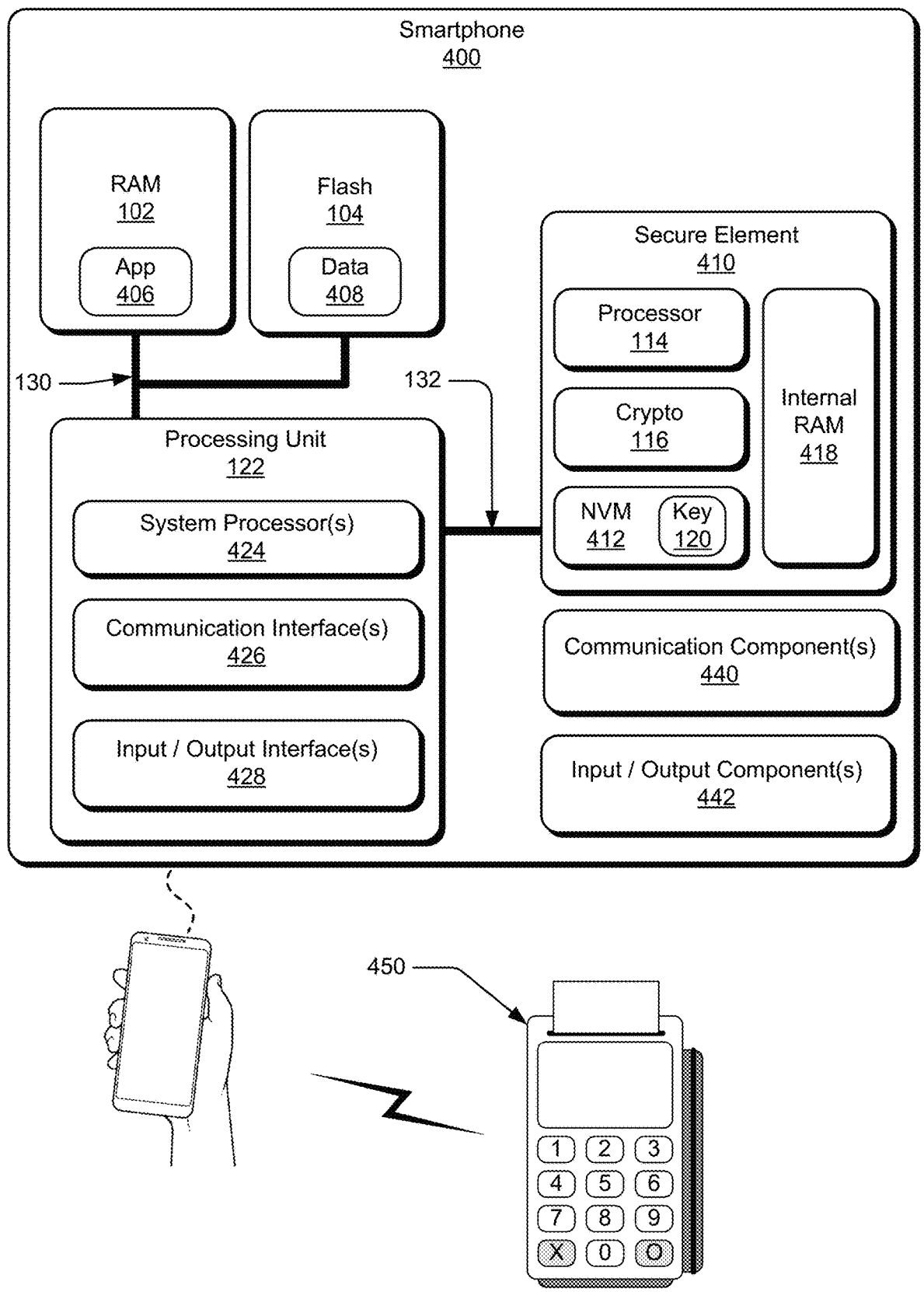
Figure 4:
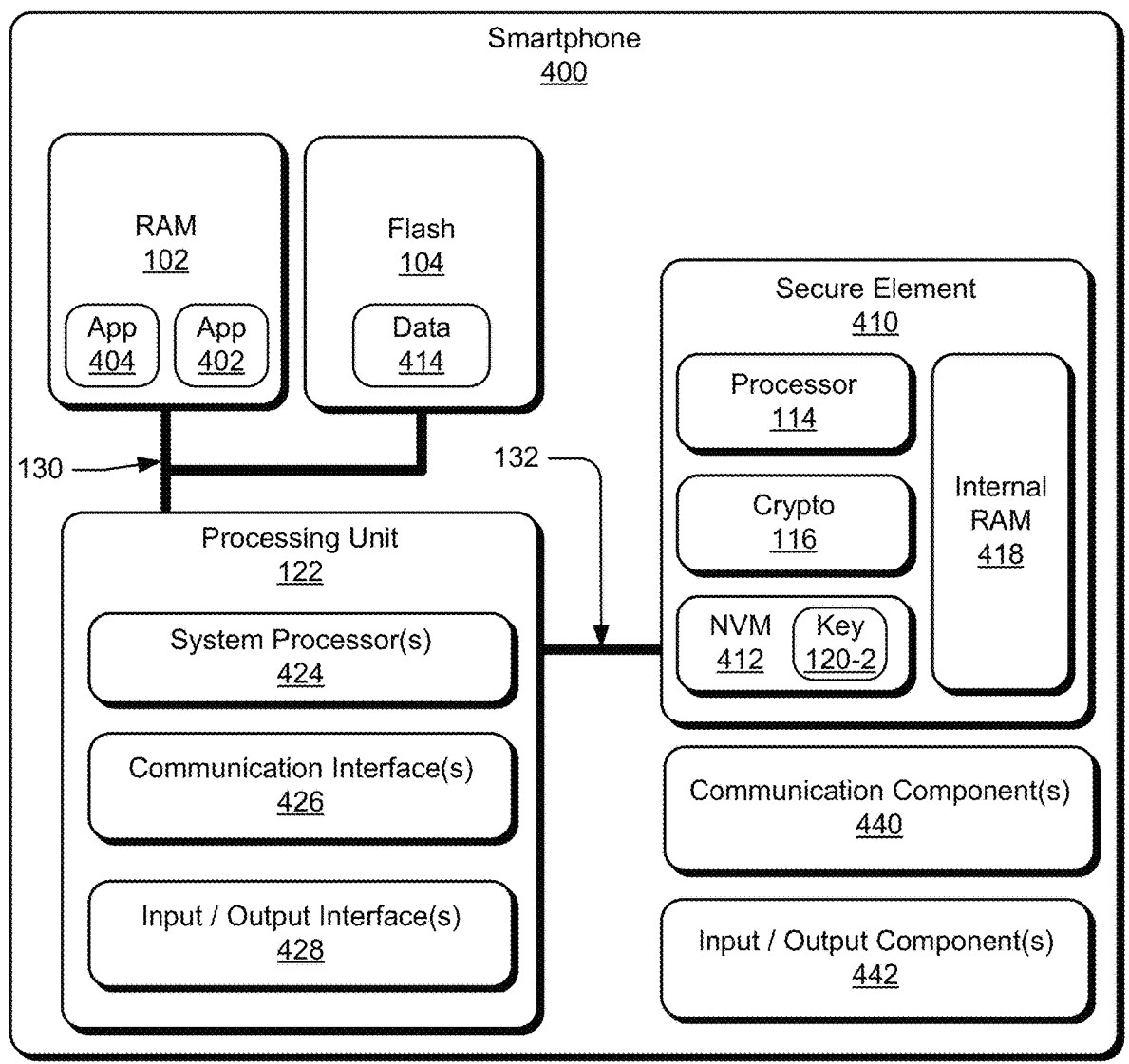
Figure 2:
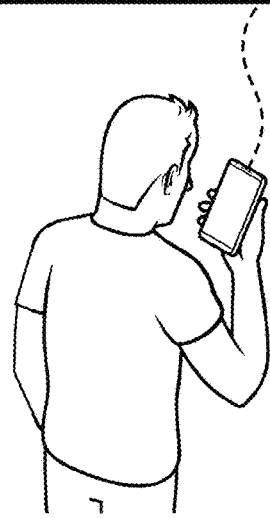

FIG. 4-1 illustrates an example configuration of a secure element 410 that leverages the RAM 102 and the flash memory 104 of a smartphone 400 to complete a financial transaction with a cash register 450. The smartphone 400 and the secure element 410 include similar components to the computer system 100 and secure element 110 illustrated in FIG. 1, with the memory 112 of the secure element 110 comprising an internal RAM 418 and a non-volatile memory 412 in the secure element 410.

The smartphone 400 is an example device of the computer system 100 of FIG. 1, with some additional detail. The smartphone 400 includes the RAM 102, the flash memory 104, the processing unit 122, and the secure element 410. The smartphone 400 also includes one or more communication components 440 and one or more input/output components 442. The processing unit 122 also includes one or more system processors 424, one or more communication interfaces 426, and one or more input/output interfaces 428.

The system processors 424 execute computer-executable instructions and perform operations of the smartphone 400. The system processors 424 may include any combination of one or more controllers, microcontrollers, processors, microprocessors, hardware processors, graphics processors, video processors, and the like.

The communication components 440 enable wired or wireless communication of data between the smartphone 400 and other devices, computer systems, and networks (e.g., the cash register 450). The communication components 440 can include receivers, transmitters, and transceivers for various types of wired and wireless communications. The communication components 440 may include a short-range radio (e.g., Near Field Communication (NFC) transceiver) capable of connecting to a nearby device and a cellular radio for connecting to a base station. The processing unit 122 includes the communication interfaces 426 to handle messaging and protocols for transmitting and receiving communications over the communication components 440.

The input/output components 442 provide connectivity to the smartphone 400. The input/output components 442 can include a user interface device that manages a user interface of the smartphone 400. The input/output components 442 can also include sensors for obtaining contextual information indicative of a physical operating environment of the smartphone 400 or characteristics of the smartphone 400. Examples of the input/output components 442 include cameras, optical sensors, infrared sensors, radar sensors, accelerometers, temperature sensors, gyroscopes, proximity sensors, light sensors, moisture sensors, pressure sensors, and the like. The input/output components 442 may provide additional connectivity, beyond just the user interface device and the sensors. The system processors 424 may tailor operations of the smartphone 400 according to input information obtained by the input/output interfaces 428 from the input/output components 442.

As a working example, consider the smartphone 400 held by a user purchasing a product at a store. The communication components 440 detect short-range communication signals (e.g., NFC signals) from the cash register 450 as the user places the smartphone 400 near the cash register 450. The system processors 424 receive information from the communication interfaces 426 based on the communication signals received by the communication components 440. The secure element 410 acts on the information received by the system processors 424 to complete the payment. The secure element 410 loads, into the internal RAM 418, a payment application 406. The payment application 406 is loaded from the RAM 102 over the link 130 and the link 132. The secure element 410 also loads, into the internal RAM 418 or the non-volatile memory 412, the user's financial data 408 (e.g., credit card number, credit card expiration date). The financial data 408 is stored on the flash memory 104 as encrypted data. The secure element 410 loads the financial data 408 over the link 130 and the link 132. The cryptographic processing engine 116 cryptographically processes, using the cryptographic key 120, the financial data 408. The processor 114 executes the payment application 406 and completes the payment using the financial data 408. The secure element 410 then sends, through the system processors 424 and to the input/output interfaces 428 and the communication interfaces 426, a signal that indicates the payment is completed. In response to the signal, the input/output components 442 alter a user interface of the smartphone 400 to indicate a successful payment. The communication components 440 also send a message, indicating that payment is completed, to the cash register 450.

Biometric Data

FIG. 4-2 illustrates an example configuration of the secure element 410 to verify the user's biometric data to complete login to an application. The smartphone 400 and the secure element 410 include the same components as those illustrated in FIG. 4-1.

As a working example, consider the user of the smartphone 400 desires to check his credit card balance shortly after completing the financial transaction discussed in association with FIG. 4-1. The user opens bank application 404 on the smartphone 400. The bank application 404 prompts the user to provide his username and password. The input/output components 442 alter the user interface of the smartphone 400 to indicate that the user may use biometric data (e.g., facial recognition data, fingerprint data) to enter his account information. In response to the user selecting the autofill option, the input/output components 442 activate a sensor (e.g., an infrared camera or radar system) to take an image of the user's face. The system processors 424 receive the facial image and send it to the secure element 410. The secure element 410 then loads, into the internal RAM 418 over the payment application 406, a password manager application 402. The secure element 410 also loads, from the flash memory 104 and into the internal RAM 418 or the non-volatile memory 412, the user facial recognition data 414. The cryptographic processing engine 116 decrypts, using cryptographic key 120-2, the facial recognition data 414. The processor 114 compares the facial recognition data 414 to the facial image received from the system processors 424. If the facial image matches the facial recognition data 414, the secure element 410 provides the username and password to the bank application 404. The bank application 404 receives the username and password and logs the user into her credit card account.

Network Authentication

Figure 5:
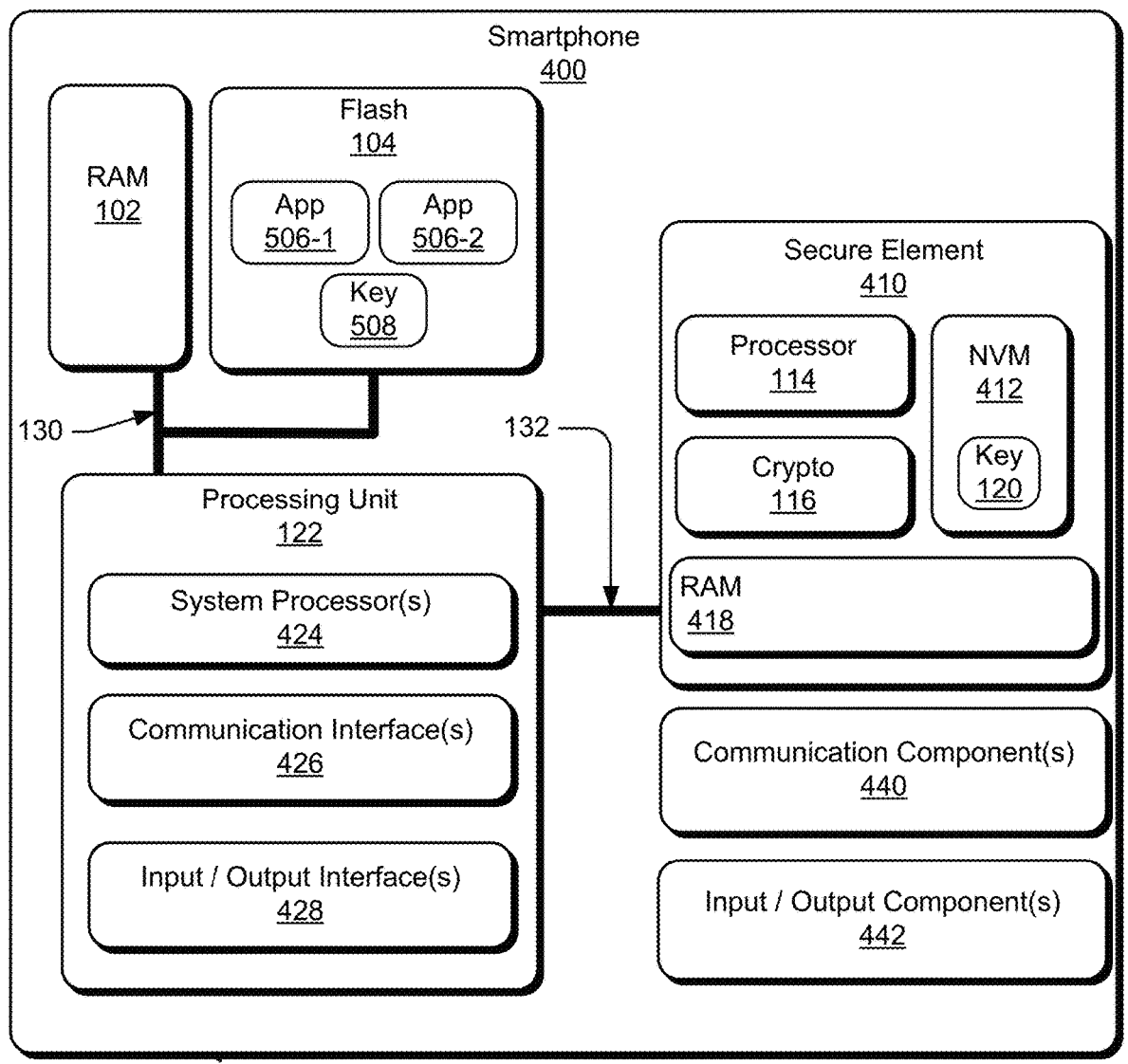
Figure 1:
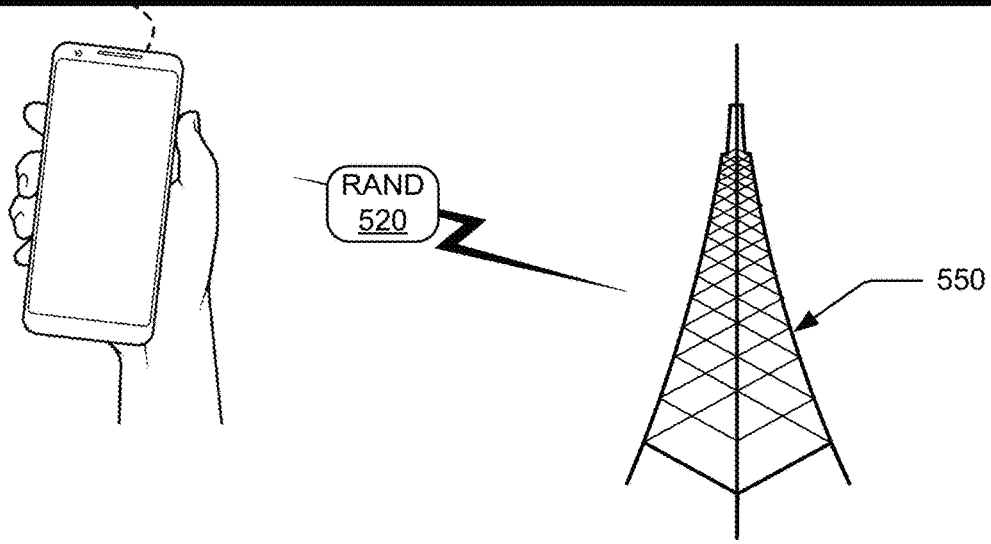
Figures 2, 5:
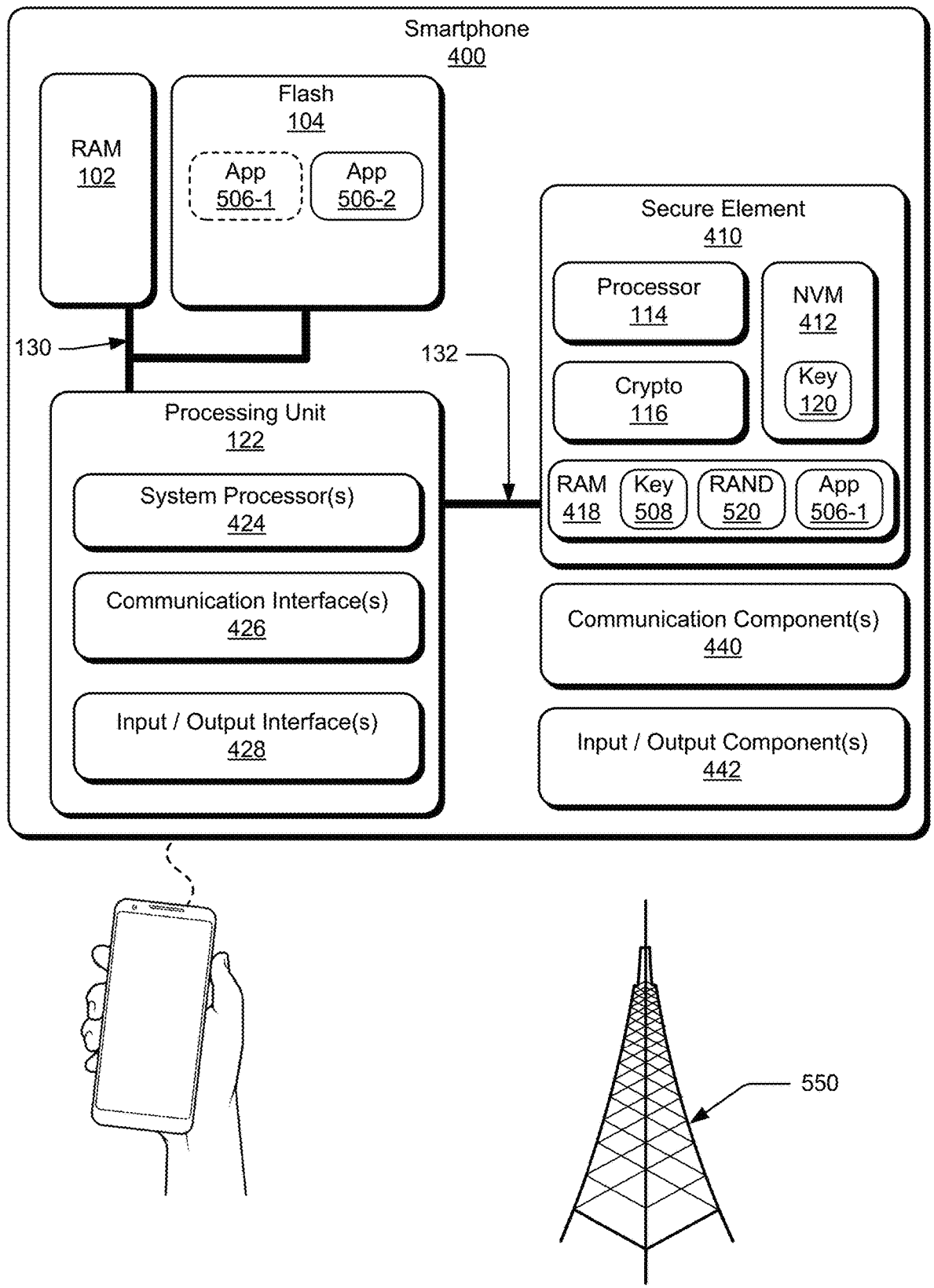
Figures 3, 5:
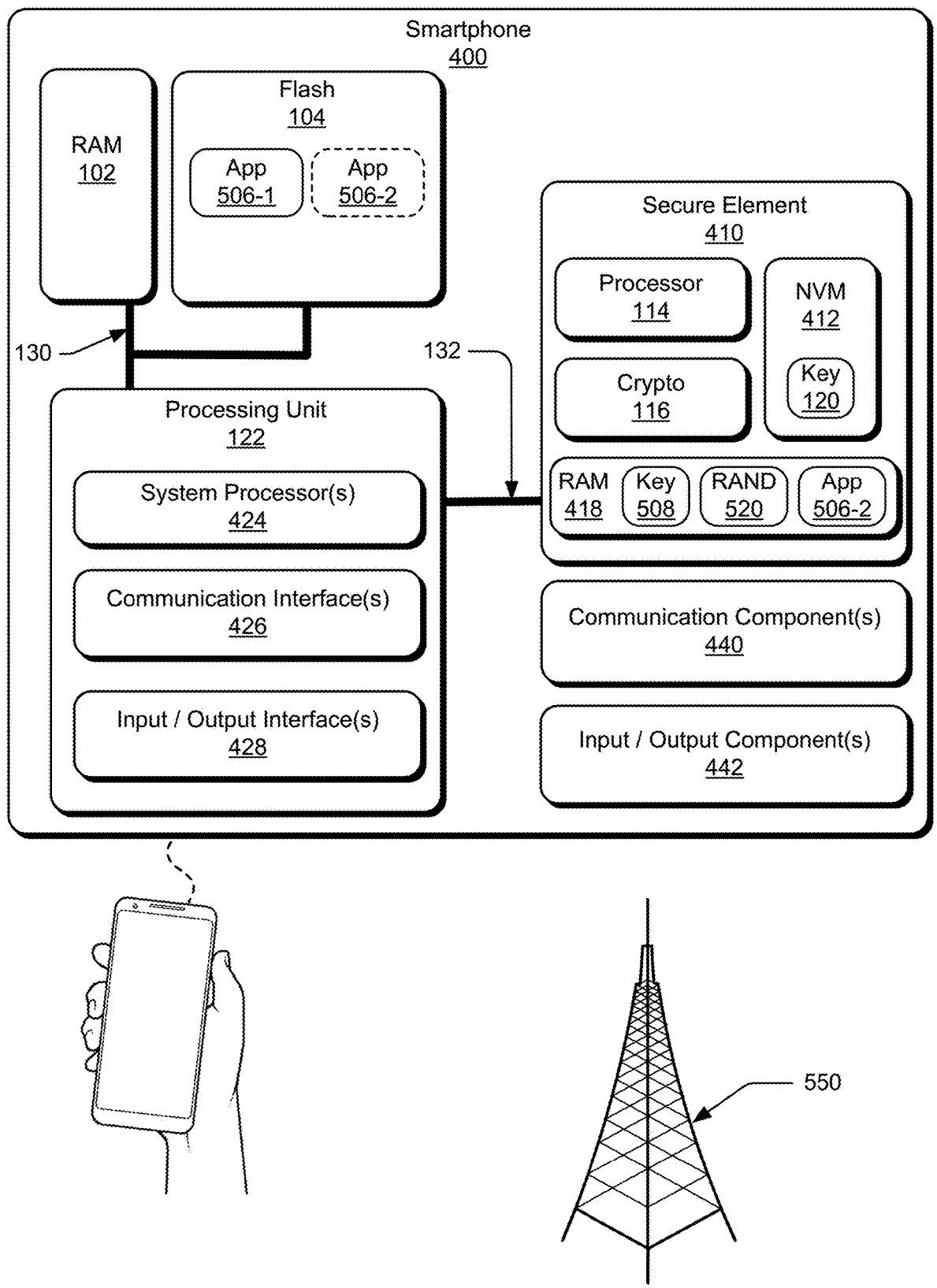
Figures 4, 5:
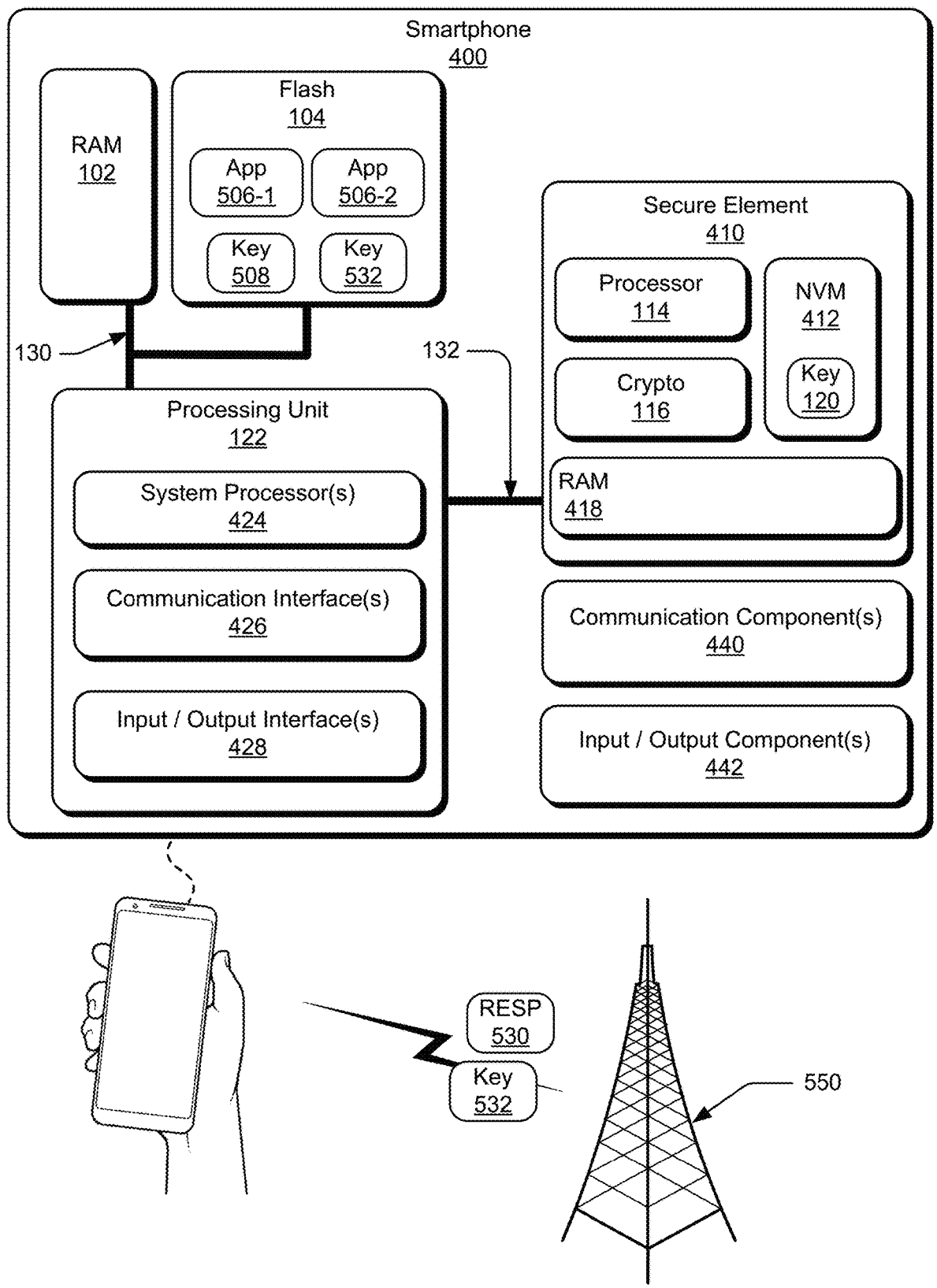

FIGS. 5-1 through 5-4 illustrate an example configuration of the secure element 110 to connect smartphone 400 to a mobile network 550. The smartphone 400 and secure element 410 include the same components as those illustrated in FIGS. 4-1 and 4-2.

As another working example, consider the smartphone 400 in FIG. 5-1 that is powered on and attempts to connect to the mobile network 550. The communication components 440 send a message to the mobile network 550 to initiate a connection procedure. The message includes the identity of the mobile network 550 and a subscriber identification for the smartphone 400. In response, the mobile network 550 sends an authentication request, including a random value 520, to the smartphone 400. The communication components 440 detect the signals with the authentication request and forward, via the communication interfaces 426, the authentication request to the system processors 424. The system processors 424 send the authentication request to the secure element 410.

In FIG. 5-2, the secure element 410 loads the random value 520 into the internal RAM 418 and acts on the authentication request to compute a response value. The secure element 410 loads, from the flash memory 104 and into the internal RAM 418, a network authentication software 506-1. The secure element 410 also loads, into the internal RAM 418, an authentication key 508. The authentication key 508 is stored on the flash memory 104 as encrypted data. The mobile network 550 initially provided the authentication key 508 to the smartphone 400, within a mobile-network-operator (MNO) profile, during a provisioning step upon subscription of the smartphone 400 to the mobile network 550. The cryptographic processing engine 116 uses the cryptographic key 120 to cryptographically process the authentication key 508. The processor 114 applies algorithms contained in the network authentication software 506-1 on the random value 520 and the authentication key 508 to obtain a response value 530.

As illustrated in FIG. 5-3, before transmitting the response value 530 to the mobile network 550, the secure element 410 loads, into the internal RAM 418 and from flash memory 104, a network cipher software 506-2 over the network authentication software 506-1. The processor 114 applies algorithms contained in the network cipher software 506-2 to the random value 520 and the authentication key 508 to generate a session key 532.

As illustrated in FIG. 5-4, the secure element 410 sends the response value 530 and the session key 532 to the communication components 440. The communication components 440 send an authentication response, including the response value 530 and the session key 532, to the mobile network 550. If the response value 530 matches an expected value, then the smartphone 400 is authenticated and given access to the mobile network 550. Subsequent voice communications between the smartphone 400 and the mobile network 550 are encrypted (and decrypted) using the session key 532.

After the authentication response is transmitted, the secure element 410 removes the network cipher software 506-2 from the internal RAM 418. The cryptographic processing engine 116 then cryptographically processes, using the cryptographic key 120 or an updated cryptographic key (not shown), the authentication key 508 and the session key 532. The authentication key 508 and the session key 532 are written to the flash memory 104 and removed from the internal RAM 418.

Examples

In the following section, examples are provided.

Example 1: A secure element for use in a computer system, the secure element comprising: a processor; a memory; and a cryptographic processing engine, the secure element, in response to a request requiring use of a sensitive information, configured to: load, into the memory over a first interface and from a first external memory of the computer system, a security application or a portion of the security application, the first external memory accessible by a processing unit of the computer system, the processing unit external to the secure element; load, into the memory over the first interface or a second interface and from the first external memory or a second external memory of the computer system, the sensitive information, the second external memory accessible by the processing unit; cryptographically process, by the cryptographic processing engine alone or in combination with the processor and using a cryptographic key, the sensitive information, the cryptographic key retrieved from the memory; execute, by the processor, the security application or the portion of the security application to generate, using the sensitive information, a result; and output, by the processor, the result to the processing unit.

Example 2: The secure element of example 1, wherein the secure element is configured to: in loading the security application or the portion of the security application, load a first portion of the security application, and, in executing the security application or the portion of the security application to generate a result using the sensitive information, execute, by the processor, the first portion of the security application to generate, using the sensitive information, a first intermediate result; wherein the secure element is further configured, prior to outputting the result to the processing unit, to: load, into the memory over the first interface and from the first external memory, a second portion of the security application; and execute, by the processor, the second portion of the security application to generate, using the sensitive information or the first intermediate result, a second intermediate result; and wherein the secure element, in outputting the result to the processing unit, is configured to output, by the processor, the first intermediate result or the second intermediate result.

Example 3: The secure element of any of the preceding examples, wherein the secure element is further configured to: cryptographically process, by the cryptographic processing engine alone or in combination with the processor and using the cryptographic key or a second cryptographic key, the sensitive information, the second cryptographic key retrieved from the memory; write, over the sensitive information in the first external memory or the second external memory, the cryptographically-processed sensitive information to the first external memory or the second external memory; and remove the sensitive information from the memory.

Example 4: The secure element of example 1 or example 2, wherein the secure element is further configured to: determine that the sensitive information was modified; cryptographically process, by the cryptographic processing engine alone or in combination with the processor and using the cryptographic key or a second cryptographic key, the modified sensitive information, the second cryptographic key retrieved from the memory; write, over the sensitive information in the first external memory or the second external memory, the cryptographically-processed modified sensitive information to the first external memory or the second external memory; and remove the modified sensitive information from the memory.

Example 5: The secure element of example 1 or example 2, wherein the secure element is further configured to: determine that the sensitive information was not modified; and remove the sensitive information from the memory.

Example 6: The secure element of any of the preceding examples, wherein the secure element, prior to executing the security application, the portion of the security application, the first portion of the security application, or the second portion of the security application, is further configured to cryptographically process, by the cryptographic processing engine alone or in combination with the processor and using the cryptographic key or a third cryptographic key, the security application, the portion of the security application, the first portion of the security application, or the second portion of the security application respectively, the third cryptographic key retrieved from the memory.

Example 7: The secure element of any of the preceding examples, wherein the secure element, in response to a second request requiring use of a second sensitive information, is configured to: load, into the memory over the first interface and from the first external memory, a second security application or a portion of the second security application; load, into the memory over the first interface or the second interface and from the first external memory or the second external memory, the second sensitive information; cryptographically process, by the cryptographic processing engine alone or in combination with the processor and using the cryptographic key or a fourth cryptographic key, the second sensitive information, the fourth cryptographic key retrieved from the memory; execute, by the processor, the second security application or the portion of the second security application to generate, using the second sensitive information, a second result; and output, by the processor, the second result to the processing unit, the second result effective to authenticate access to resources external to the computer system, authenticate access to internal resources of the computer system, facilitate a financial transaction, perform a cryptographic function, or perform a health-monitoring function.

Example 8: The secure element of any of the preceding examples, wherein the first interface is a low-latency interface for direct read and write operations, by the secure element, from the first external memory or the second external memory.

Example 9: The secure element of any of example 1 through example 7, wherein the secure element is assigned a direct byte-for-byte correlation, via the first interface, to the security application, the portion of the security application, the first portion of the security application, the second portion of the security application, the second security application, the portion of the second security application, the sensitive information, or the second sensitive information, the direct byte-for-byte correlation enabling the secure element to have memory-mapped access to data stored on the first external memory or the second external memory.

Example 10: The secure element of any of the preceding examples, wherein the first external memory and the second external memory are not certified as having a security functionality.

Example 11: The secure element of any of the preceding examples, wherein the sensitive information comprises one or more of a network access credential, a cryptographic key, a security key, financial data, a password, user health data, or sensitive user data.

Example 12: The secure element of any of the preceding examples, wherein the memory of the secure element comprises a non-volatile random-access memory.

Example 13: The secure element of example 12, wherein the non-volatile random-access memory comprises a magnetic random-access memory or a resistive random-access memory.

Example 14: The secure element of any of example 1 through example 11, wherein the memory of the secure element comprises a random-access memory and a non-volatile memory, and wherein the secure element is configured to load: the security application, the portion of the security application, the first portion of the security application, the second portion of the security application, the second security application, or the portion of the second security application into the random-access memory; the sensitive information or the second sensitive information into the random-access memory or the non-volatile memory; and the cryptographic key, the second cryptographic key, the third cryptographic key, or the fourth cryptographic key into the non-volatile memory.

Example 15: The secure element of example 14, wherein the non-volatile memory of the secure element comprises read-only memory and flash memory, and wherein the secure element is configured to load the sensitive information or the second sensitive information into the flash memory or the random-access memory and the cryptographic key, the second cryptographic key, the third cryptographic key, or the fourth cryptographic key into the flash memory.

Example 16: The secure element of any of the preceding examples, wherein an operating system is stored in the memory, the non-volatile random-access memory, the non-volatile memory, or the read-only memory, and wherein the processor is configured to use the operating system to execute the security application, the portion of the security application, the first portion of the security application, the second portion of the security application, the second security application, or the portion of the second security application.

Example 17: The secure element of any of the preceding examples, wherein the cryptographic processing of the sensitive information, the second sensitive information, the security application, the portion of the security application, the first portion of the security application, the second portion of the security application, the second security application, or the portion of the second security application comprises encrypting, authenticating, and verifying the freshness of the sensitive information, the second sensitive information, the security application, the portion of the security application, the first portion of the security application, the second portion of the security application, the second security application, or the portion of the second security application respectively.

Example 18: The secure element of any of the preceding examples, wherein the computer system comprises a smartphone, a wearable computer, a laptop, a server, a networked multimedia system, a voice-assistant system, or a tablet.

Example 19: A computing device comprising: the secure element of any of the preceding examples; a processing unit linked, via a first interface, to the secure element; a first external memory, wherein the storage capacity of the first external memory is larger than the storage capacity of the memory and the first external memory is linked, via the first interface or a second interface, to the secure element; and a second external memory, wherein the storage capacity of the second external memory is larger than the storage capacity of the memory and the second external memory is linked, via the first interface or the second interface, to the secure element.

Example 20: The computing device of example 19, wherein the second interface comprises a low-latency interface for direct read and write operations, by the secure element or an interface enabling the secure element to have memory-mapped access to a sensitive information, a security application, or a portion of the security application stored in the first external memory.

Example 21: The computing device of example 19 or example 20, wherein the computing device is configured to, based on the output of the result by the secure element, authenticate access to resources external to the computing device, authenticate access to internal resources of the computing device, facilitate a financial transaction, perform a cryptographic function, or perform a health-monitoring function.

Example 22: The computing device of any of example 19 through example 21, wherein the computing device comprises a smartphone, a wearable computer, a laptop, a server, a networked multimedia system, a voice-assistant system, or a tablet.

Example 23: A method for a secure element of a computer system to respond to a request requiring use of a sensitive information comprising: loading, into a memory of the secure element over a first interface and from a first external memory of the computer system, a security application or a portion of the security application, the first external memory accessible by a processing unit of the computer system, the processing unit and the first external memory external to the secure element; loading, into the memory over the first interface or a second interface and from the first external memory or a second external memory, the sensitive information, the second external memory accessible by the processing unit and external to the secure element; cryptographically processing, by a cryptographic processing engine of the secure element alone or in combination with a processor of the secure element and using a cryptographic key, the sensitive information, the cryptographic key retrieved from the memory; executing, by the processor, the security application or the portion of the security application to generate, using the sensitive information, a result; and outputting, via the processor and in response to the request, the result to the processing unit.

Example 24: The method of example 23 further comprising: in loading the security application or the portion of the security application, loading a first portion of the security application; in executing the security application or the portion of the security application to generate a result, executing the first portion of the security application to generate, using the sensitive information, a first intermediate result; wherein prior to outputting the result to the processing unit: loading, into the memory over the first interface and from the first external memory, a second portion of the security application; and executing, by the processor, the second portion of the security application to generate, using the sensitive information or the first intermediate result, a second intermediate result; and in outputting the result to the processing unit, outputting, by the processor, the first intermediate result or the second intermediate result.

Example 25: The method of example 23 or example 24 further comprising: cryptographically processing, by the cryptographic processing engine alone or in combination with the processor and using the cryptographic key or a second cryptographic key, the sensitive information, the second cryptographic key retrieved from the memory; writing, over the sensitive information in the first external memory or the second external memory, the cryptographically-processed sensitive information to the first external memory or the second external memory; and removing the sensitive information from the memory.

Example 26: The method of example 23 or example 24 further comprising: determining that the sensitive information was modified; cryptographically processing, by the cryptographic processing engine alone or in the combination with the processor and using the cryptographic key or a second cryptographic key, the modified sensitive information, the second cryptographic key retrieved from the memory; writing, over the sensitive information in the first external memory or the second external memory, the cryptographically-processed modified sensitive information to the first external memory or the second external memory; and removing the modified sensitive information from the memory.

Example 27: The method of example 23 or example 24 further comprising: determining that the sensitive information was not modified; and removing the sensitive information from the memory.

Example 28: The method of any of example 23 through example 27, prior to executing the security application, the portion of the security application, the first portion of the security application, or the second portion of the security application, cryptographically processing, by the cryptographic processing engine alone or in combination with the processor and using the cryptographic key or a third cryptographic key, the security application, the portion of the security application, the first portion of the security application, or the second portion of the security application respectively, the third cryptographic key retrieved from the memory.

Example 29: The method of any of example 23 through example 28, in response to a second request requiring use of a second sensitive information, further comprising: loading, into the memory over the first interface and from the first external memory, a second security application or a portion of the second security application, the second security application or the portion of the second security application; loading, into the memory over the first interface or the second interface and from the first external memory or the second external memory, a second sensitive information; cryptographically processing, by the cryptographic processing engine alone or in combination with the processor and using the cryptographic key or a fourth cryptographic key, the second sensitive information, the fourth cryptographic key retrieved from the memory; executing, by the processor, the second security application or the portion of the second security application to generate, using the second sensitive information, a second result; and outputting, by the processor, the second result to the processing unit, the second result effective to authenticate access to resources external to the computer system, authenticate access to internal resources of the computer system, facilitate a financial transaction, perform a cryptographic function, or perform a health-monitoring function.

Example 30: The method of any of example 23 through example 29, wherein the cryptographic processing of the sensitive information, the second sensitive information, the security application, the portion of the security application, the first portion of the security application, the second portion of the security application, the second security application, or the portion of the second security application comprises encrypting, authenticating, and verifying the freshness of the sensitive information, the second sensitive information, the security application, the portion of the security application, the first portion of the security application, the second portion of the security application, the second security application, or the portion of the second security application respectively.

Example 31: The method of any of example 23 through example 30, further comprising, based on the outputting of the result, the first intermediate result, the second intermediate result, or the second result by the secure element, authenticating access to resources external to the computer system, authenticate access to internal resources of the computer system, facilitate a financial transaction, perform a cryptographic function, or perform a health-monitoring function.

CONCLUSION

While various configurations, and methods for using, a secure element that leverages resources of a computer system have been described in language specific to features and/or methods, it is to be understood that the subject of the appended claims is not necessarily limited to the specific features or methods described. Rather, the specific features and methods are disclosed as non-limiting examples of a secure element leveraging external resources.

What is claimed is:

1. An electronic device comprising:
a non-volatile memory device storing instructions of a security application;
a random-access memory device;
a system-on-chip comprising a processing unit, a first interface coupled to the non-volatile memory device, a second interface coupled to the random-access memory device, and a third interface; and
a secure element coupled to the third interface of the system-on-chip, the secure element comprising:
a processor;
a cryptographic processing engine;
a random-access memory; and
a non-volatile memory, the non-volatile memory storing instructions that, responsive to execution by the processor, directs the secure element to:
load, in response to a request for use of sensitive information, the security application into the random-access memory of the secure element over the third interface and from the non-volatile memory device of the electronic device, the non-volatile memory device external to the secure element and the system-on-chip;
load the sensitive information into the random-access memory or the non-volatile memory of the secure element over the third interface and from the non-volatile memory device or the random-access memory device of the electronic device;
retrieve, from the non-volatile memory of the secure element, a cryptographic key useful to perform cryptographic processes;
cryptographically process the sensitive information with the cryptographic processing engine and using the cryptographic key retrieved from the non-volatile memory of the secure element to provide cryptographically processed information;
execute, via the processor of the secure element, the security application to generate a result based on the cryptographically processed information; and
output, via the processor of the secure element, the result generated by the security application to the processing unit of the system-on-chip.

2. The electronic device of claim 1, wherein the secure element is further directed to:
write the cryptographically processed sensitive information, over the sensitive information in the non-volatile memory device or the random-access memory device; and
remove the sensitive information from the random-access memory or the non-volatile memory of the secure element.

3. The electronic device of claim 1, wherein the secure element is further directed to:
determine that the sensitive information was modified;
cryptographically process the modified sensitive information with the cryptographic processing engine and using the cryptographic key or a another cryptographic key retrieved from the non-volatile memory of the secure element to provide cryptographically processed modified sensitive information;
write the cryptographically processed modified sensitive information over the sensitive information in the non-volatile memory device or the random-access memory device; and
remove the modified sensitive information from the random-access memory or the non-volatile memory of the secure element.

4. The electronic device of claim 1, wherein the secure element is further directed to:
determine that the sensitive information was not modified; and
remove the sensitive information from the random-access memory or the non-volatile memory of the secure element.

5. The electronic device of claim 1, wherein the secure element is directed to, prior to executing the security application, cryptographically process the security application with the cryptographic processing engine and using the cryptographic key or another cryptographic key retrieved from the non-volatile memory of the secure element.

6. The electronic device of claim 1, wherein the request is a first request to use first sensitive information, the security application is a first security application, the result is a first result, and the secure element is further directed to:
load, in response to a second request to use second sensitive information, a second security application into the random-access memory of the secure element over the third interface and from the non-volatile memory device;
load the second sensitive information into the random-access memory or the non-volatile memory of the secure element over the third interface and from the non-volatile memory device or the random-access memory device;
cryptographically process the second sensitive information with the cryptographic processing engine and using the cryptographic key or another cryptographic key retrieved from the non-volatile memory of the secure element to provide second cryptographically processed information;
execute, via the processor of the secure element, the second security application to generate a second result based on the second cryptographically processed information; and
output, via the processor of the secure element, the second result generated by the second security application to the processing unit of the system-on-chip.

7. The electronic device of claim 1, wherein:
the first interface is a low-latency interface for direct read operations or direct write operations, by the secure element, from the non-volatile memory device; or
the second interface is a low-latency interface for direct read operations or direct write operations, by the secure element, from the random-access memory device.

8. The electronic device of claim 1, wherein:
the secure element is configured with a direct byte-for-byte correlation, via the first interface, with the non-volatile memory device; or
the secure element is configured with a direct byte-for-byte correlation, via the second interface, with the random-access memory device, the direct byte-for-byte correlation enabling the secure element to have memory-mapped access to data stored on the non-volatile memory device or the random-access memory device.

9. The electronic device of claim 1, wherein the non-volatile memory device or the random-access memory device is not certified as as secure data storage devices.

10. The electronic device of claim 1, wherein:
the non-volatile memory device has a storage capacity that is greater than a respective storage capacity of the random-access memory and the non-volatile memory of the secure element; and
the random-access memory device has a storage capacity that is greater than the respective storage capacity of the random-access memory and non-volatile memory of the secure element.

11. The electronic device of claim 1, wherein the result provided to the processing unit of the system-on-chip is useful to:
authenticate access to resources external to the electronic device;
authenticate access to internal resources of the electronic device;
facilitate a financial transaction using the electronic device;
perform a cryptographic function with the electronic device; or
perform a health-monitoring function with the electronic device.

12. The electronic device of claim 1, wherein to cryptographically process the sensitive information comprises encrypting, authenticating, or verifying freshness of the sensitive information or the security application, respectively.

13. A method for a secure element of an electronic device to respond to a request for use of sensitive information, the method comprising:
receiving, via a first interface between a system-on-chip of the electronic device and the secure element, the request for use of the sensitive information from a processing unit of the system-on-chip;
loading, in response to the request for use of the sensitive information, a security application into a random-access memory of the secure element over the first interface and from a non-volatile memory device of the electronic device coupled with the system-on-chip via a second interface, the non-volatile memory device the system-on-chip, and the non-volatile memory device external to the secure element;
loading the sensitive information into the random-access memory or a non-volatile memory of the secure element over the first interface and from the non-volatile memory device or a random-access memory device of the electronic device coupled with the system-on-chip via a third interface, the random-access memory device external to the secure element;
retrieving, from the non-volatile memory of the secure element, a cryptographic key useful to perform cryptographic processes;
cryptographically process the sensitive information with a cryptographic processing engine of the secure element and using the cryptographic key retrieved from the non-volatile memory of the secure element to provide cryptographically processed information;
executing, via a processor of the secure element, the security application to generate a result based on the cryptographically processed information; and
outputting, via the processor of the secure element, the result generated by the security application to the processing unit of the system-on-chip.

14. The method of claim 13, further comprising:
writing the cryptographically processed information over the sensitive information in the non-volatile memory device or the random-access memory device; and
removing the sensitive information from the random-access memory or the non-volatile memory of the secure element.

15. The method of claim 14, further comprising, prior to executing the security application, cryptographically processes the security application with the cryptographic processing engine and using the cryptographic key or another cryptographic key retrieved from the non-volatile memory of the secure element.

16. The method of claim 13, further comprising:
determining that the sensitive information was modified;
cryptographically process the modified sensitive information with the cryptographic processing engine and using the cryptographic key or another cryptographic key retrieved from the non-volatile memory of the secure element to provide cryptographically processed modified sensitive information;

writing the cryptographically processed modified sensitive information over the sensitive information in the non-volatile memory device or the random-access memory device; and removing the modified sensitive information from the random-access memory or the non-volatile memory of the secure element.

17. The method of claim 13, further comprising:

determining that the sensitive information was not modified; and removing the sensitive information from the random-access memory or the non-volatile memory of the secure element.

18. The method of claim 13, wherein the request is a first request to use first sensitive information, the security application is a first security application, the result is a first result, and the method further comprises:

receiving, via the first interface, a second request for use of second sensitive information from a processing unit of the system-on-chip;

loading, in response to the second request, a second security application into the random-access memory of the secure element over the first interface and from the non-volatile memory device;

loading the second sensitive information into the random-access memory or the non-volatile memory of the secure element over the first interface and from the non-volatile memory device or the random-access memory device;

cryptographically processing the second sensitive information with the cryptographic processing engine and using the cryptographic key or another cryptographic key retrieved from the non-volatile memory of the secure element to provide second cryptographically processed information;

executing, via the processor of the secure element, the second security application to generate a second result based on the second cryptographically processed information; and outputting, via the processor of the secure element, the second result to the processing unit of the system-on-chip.

19. The method of claim 13, wherein cryptographically processing the sensitive information comprises encrypting, authenticating, or verifying freshness of the sensitive information or the security application, respectively.

20. The method of claim 13, further comprising, based on the result output to the processing unit of the system-on-chip, authenticating access to resources external to the electronic device, authenticating access to internal resources of the electronic device, facilitating a financial transaction using the electronic device, performing a cryptographic function with the electronic device, or performing a health-monitoring function with the electronic device.

* * * * *

UNITED STATES PATENT AND TRADEMARK OFFICE
CERTIFICATE OF CORRECTION

PATENT NO. : 12,229,309 B2
APPLICATION NO. : 17/757957
DATED : February 18, 2025
INVENTOR(S) : Olivier Jean Benoit, Prasad Modali and Vinoth Kumar Deivasigamani Page 1 of 1

It is certified that error appears in the above-identified patent and that said Letters Patent is hereby corrected as shown below:

In the Claims

Column 18, Lines 34-35, after "information" before "over", delete ","

Signed and Sealed this
Eighteenth Day of March, 2025

Coke Morgan Stewart
*Acting Director of the United States Patent and Trademark Office*